July 25, 1933.　　　　P. F. ROSSMANN　　　　1,920,108

NUT CASTELLATING MACHINE

Filed Dec. 26, 1930　　　3 Sheets-Sheet 1

Inventor

PETER F ROSSMANN

By Nullan-Tibbetts
Attorney

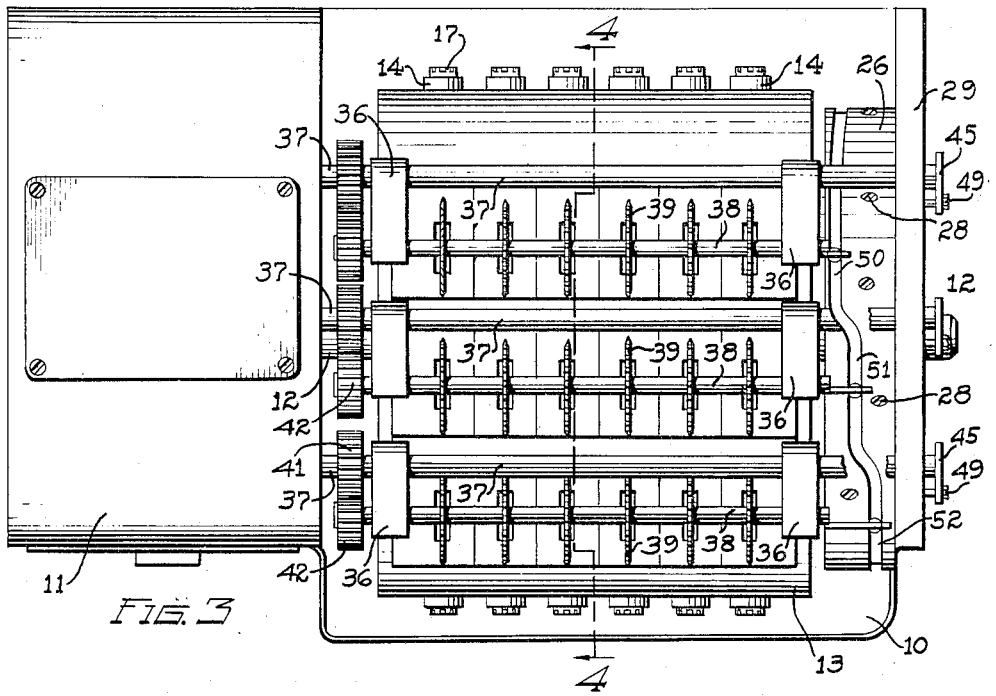
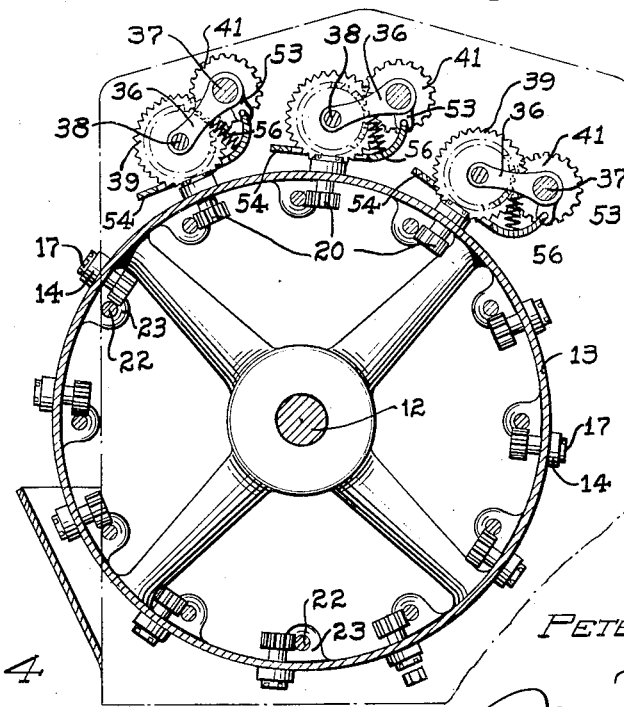

Inventor
PETER F ROSSMANN
By Mullen Sickets
Attorney

Patented July 25, 1933

1,920,108

UNITED STATES PATENT OFFICE

PETER F. ROSSMANN, OF DETROIT, MICHIGAN, ASSIGNOR TO PACKARD MOTOR CAR COMPANY, OF DETROIT, MICHIGAN, A CORPORATION OF MICHIGAN

NUT CASTELLATING MACHINE

Application filed December 26, 1930. Serial No. 504,964.

This invention relates to nut castellating machines.

An object of the invention is to provide an automatic machine for castellating nuts.

Another object of the invention is to provide a novel form of automatic indexing mechanism for the holders of a castellating machine so that the nuts will be rotated a predetermined degree in their movement between spaced saws.

A further object of the invention resides in a novel mechanism for retaining nuts in their holders while being sawed in a castellating machine.

Still another object of the invention is to provide a nut castellating machine with gangs of saws, each of which can be regulated to cut the desired depth into the nuts.

Other objects of the invention will appear from the following description taken in connection with the drawings, which form a part of this specification, and in which:

Fig. 3 is a plan view of the machine;

Fig. 4 is a sectional view of the machine taken on line 4—4 of Fig. 3;

Figure 1:
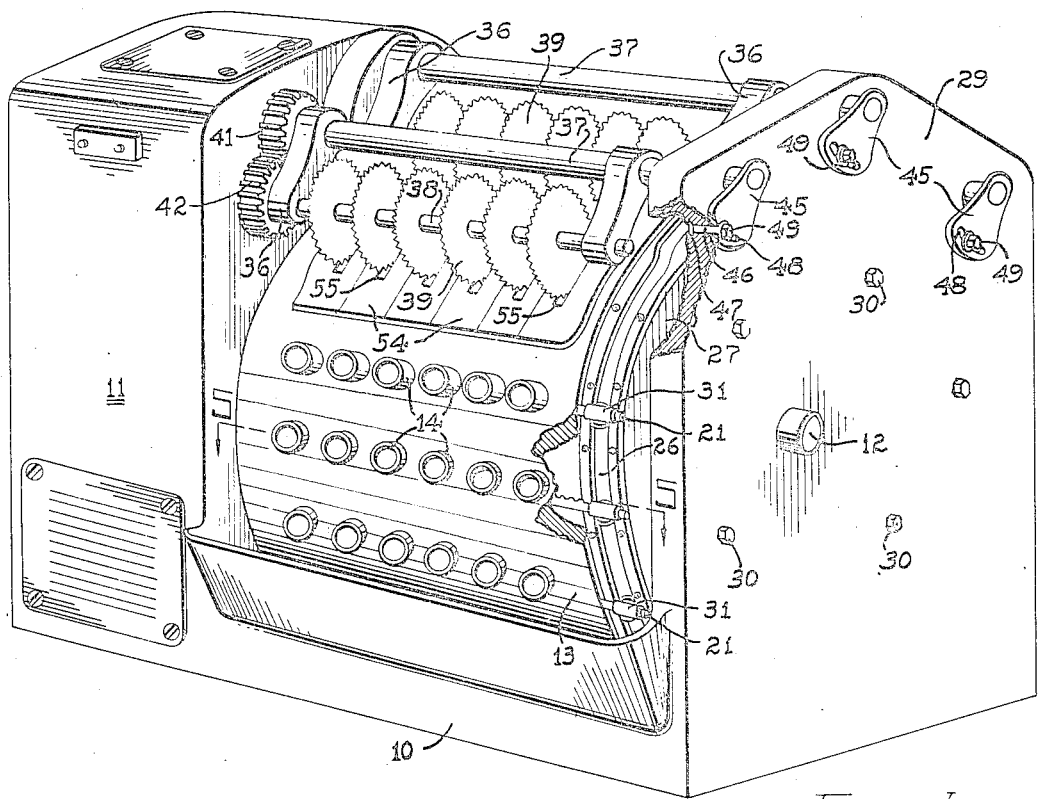
Fig. 1 is a perspective view of a nut castellating machine incorporating my invention.
Figure 2:
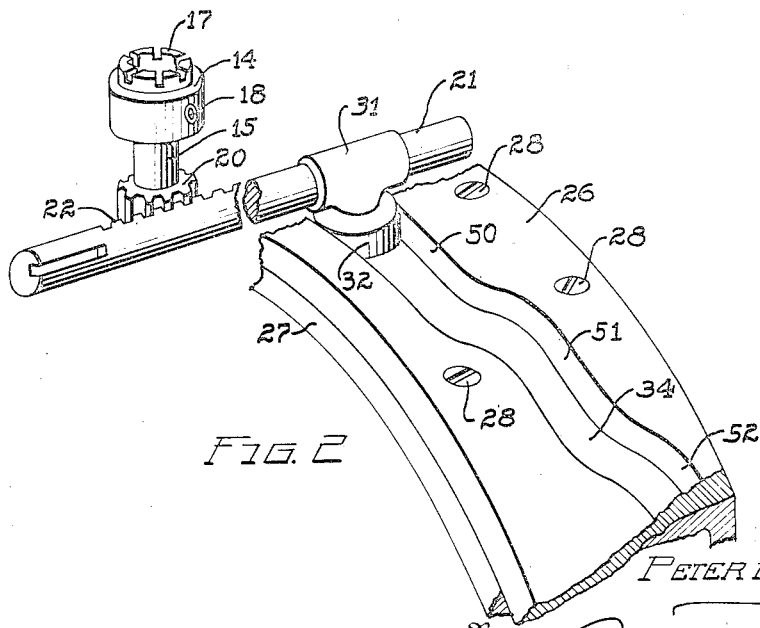
Fig. 2 is a fragmentary perspective view of the indexing mechanism shown associated with one of the nut holders.
Figure 5:
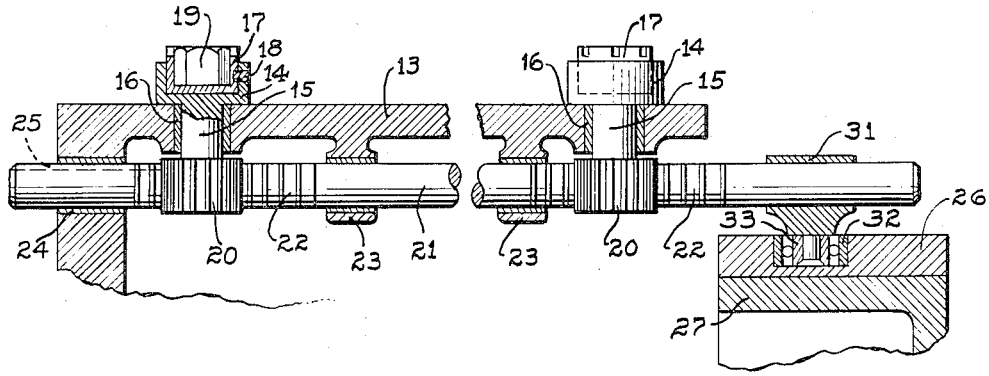
Fig. 5 is a sectional view of the machine taken on line 5—5 of Fig. 1, illustrating the indexing mechanism.
Figure 6:
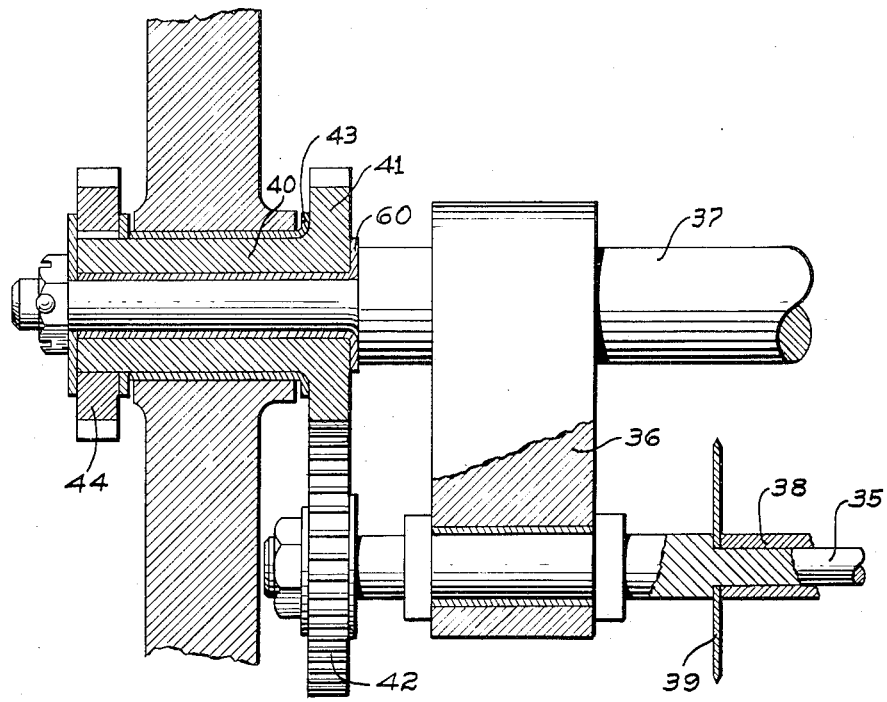
Fig. 6 is a fragmentary view partly in section and partly in plan showing a driving mechanism and a mounting for one of the saw gangs.

Referring now to the drawings by characters of reference, 10 indicates generally a casing which consists of a closed end 11 for housing an electric motor and suitable driving mechanism (not shown). A shaft 12 extends across the open end of the casing and is driven through suitable means through the driving mechanism within the closed casing 11, and upon this shaft is fixed a drum 13.

A plurality of holding means are arranged in parallel rows around the drum and consist of a holder portion 14 and a shaft portion 15 which extends through the peripheral wall of the drum and is carried by the bearing 16. The holder 14 is arranged to receive an insert 17, and a set screw 18 extends through the holder and engages the insert to maintain them in fixed relation. The interior wall of the insert can be of a form corresponding to that of the nut 19 which it is adapted to receive, and it will be understood that the interior of these inserts can be of different forms and sizes to suit the nut which is to be castellated. The inner end of the shaft 15 has a gear 20 fixed thereto.

Associated with the gears 20, I provide automatic indexing mechanism. A shaft 21 extends in an axial direction through the drum adjacent each row of holders and is provided with teeth, as indicated at 22, which are adapted to mesh with each of the gears 20 in the row. Such shafts are carried by bearing 23 intermediate the ends of the drum and by bearings, as indicated at 24, in the end walls of the drums. Each shaft is keyed, as indicated at 25, to the drum to prevent rotation but to permit axial movement thereof. A circular indexing ring 26 is fixed to a bearing member 27 by screws 28, and such bearing member is secured to the end wall 29 of the casing by means of bolts 30. The indexing ring is thus secured adjacent one end of the drum and is arranged interiorly of the ends of the shafts 21 projecting through such end of the drum.

A bracket 31 is fixed to each of the projecting ends of the shafts 21 which overlie the index ring and a roller 32 is mounted on a bearing 33 which is carried by each of the brackets. These rollers are arranged to lie within the cam groove 34 formed in the indexing ring so that any change in the direction of the groove relative to the axis of the drum will move the shafts 21 in an axial direction and thus rotate the gears 20 and the associated holders 14.

Rows of saws are arranged in the path of the holders, and the nuts carried thereby are moved successively to the rows of saws during rotation of the drum. The gangs or rows of saws are spaced around a portion of the drum and each row is carried by a shaft 35. These shafts are rotatably mounted in brackets 36 which are fixed upon shafts 37 carried by the end wall 29 and a wall of the closed portion of the casing. Suitable spacers, as indicated at 38, are arranged on the shafts 35 intermediate the saws 39 so that the saws are maintained in line with the holders on the drum and suitable means (not shown) can be provided for fixing the saws to the shafts 35. A gear hub 40 extends through a wall of the closed casing and is formed with a gear 41 on its exterior end which meshes with the gear 42 fixed to the shaft 35. The gear hub 40 telescopes the shaft 37 extending through the wall of the closed casing and the bearing 60 is arranged intermediate the same, while another bearing 43 is arranged between the gear hub and the end wall of the closed casing through which it projects. A gear 44 is keyed to the end of the gear hub 40 interiorly of the closed casing and is rotated through suitable mechanism within the casing. Each of the gangs or rows of saws are similar in alignment and driven by similar mechanism.

The shafts 37 extend through the end wall 29 of the casing and have arms 45 fixed thereto which are adapted to be oscillated to raise or lower the gangs of saws relative to the drum. A bolt 46 is seated in an arcuate slot 47 in the interior side of the wall 29 to prevent its rotation and projects through a similarly arranged arcuate slot 48 in the arms 45 and a nut 49 is screwed upon the bolts against the arms 45 to secure them in any position of arcuate adjustment. In this manner the depth of the cut made in the nuts moving thereunder can be regulated as may be desired.

The cam groove 34 extends around the ring 26 and is formed with three offset portions 50, 51 and 52 extending intermediate the saw gangs so that the rollers 32 in following such offset paths will move the rods 21 sufficiently to rotate the gears 20 one hundred twenty degrees during the travel of the holders 14 between each row of saws. There are three rows of saws, and consequently the nuts are rotated one hundred twenty degrees after having a saw cut made thereacross before they encounter the next row of saws, and in this manner three equally spaced cuts are made across the exposed end of the nuts during their rotation beneath the saw gangs.

An arm 53 extends downwardly from the rear end of the brackets 36 and carries pressure plates 54 which are provided with openings 55 through which the saws extend. There is one of these plates extending axially across the drum beneath each row of saws and they are pressed against the exposed end of the nuts by springs 56 which also engage the arms 36. These pressure plates 54 maintain the nuts seated against the bottom of the inserts 17 during the time that the gangs of saws are in operation cutting the slots in the ends of the nuts and as the nuts cannot rotate in the inserts they are definitely positioned with relation to the saws.

As the drum rotates, an operator standing in front of the casing can readily insert the nuts into the inserts where they will remain until the drum moves them to the rear of the casing where they will fall out by gravity as they approach the bottom of the casing, as shown in Fig. 4.

It will be seen that I have provided an automatic machine for castellating nuts in which a large quantity of nuts will be quickly and automatically sawed. Furthermore, I have provided a novel mechanism for automatically indexing the nuts so that they will be positioned in a proper relation beneath similarly arranged saws for sawing at different angles, and there is also readily adjustable mechanism for regulating the depth of the cut which the saws will make.

While I have herein described in some detail a specific embodiment of my invention, which I deem to be new and advantageous and may specifically claim, I do not desire it to be understood that my invention is limited to the exact details of the construction, as it will be apparent that changes may be made therein without departing from the spirit or scope of my invention.

What I claim is:

1. In a slotting machine, a frame, a drum rotatably mounted in the frame, a group of chucks mounted on the drum for rotation about axes radial to the drum, a pinion on each of the chucks, a gear rack engaging each pinion in the group and slidably mounted on the drum to move the entire group at once, a follower on the gear rack, and a stationary cam track groove in which the follower is mounted, said groove being formed to cause the chucks to be moved to different predetermined positions as the drum rotates.

2. In a nut castellating machine, a frame, a drum mounted for continuous rotation on the frame, a plurality of rows of chucks mounted on the drum for rotation about axes radial to the drum, gears on the chucks, and means operatively engaging each of the gears of each row to rotate the associated chucks simultaneously through a predetermined angle as the drum rotates.

3. In a nut castellating machine, a plurality of continuously moving rotatable nut holders arranged in a group, a cam member having a cam follower operatively associated with a cam groove, and means connecting the cam follower to each of the nut holders whereby the entire group will be rotated simultaneously upon movement of the cam follower.

4. In a hexagonal nut slotting machine, a drum adapted to be continuously rotated, a plurality of parallel shafts movably mounted on the drum, a plurality of nut holders associated with the shafts, a plurality of spaced cutting means mounted exteriorly of the drum in the path of the work pieces as they are revolved by the drum, and means for moving the shafts relative to the drum to place each face of the nut in a position to be slotted.

5. In a nut castellating machine, a frame, a drum rotatably mounted in the frame, nut holders carried by the drum; castellating means comprising a plurality of shafts adjustably mounted in the frame, pairs of arms on each of the shafts, spindles rotatably mounted in the arms, saws carried by the spindles; means for adjusting the position of the saws relative to the nuts and means carried by the arms for seating the nuts in the holders, said means being automatically adjusted to the nuts as the saws are adjusted thereto.

6. In a slotting machine, a frame, a drum rotatably mounted in the frame, nut holders carried by the drum; means for cutting the slots comprising a plurality of shafts adjustably mounted in the frame, pairs of arms on each of the shafts, spindles rotatably mounted in the arms, saws carried by the spindles, plates carried by the arms and bearing on the nuts, and springs urging the plates against the nuts during the slotting operation.

7. In an automatic slotting machine, a drum adapted to be continuously rotated, rows of means carried by the drum for holding hexagonal nuts, rows of slotting saws arranged in the path of the holding means simultaneously to cut parallel slots in the several rows of nuts, and means for rotating the holding means to place each face of the nuts held thereby in a position to be slotted.

8. In an automatic slotting machine, a drum mounted for rotation about its longitudinal axis, a plurality of devices for holding hexagonal nuts rotatably mounted on the drum, a plurality of rows of saws rotatably mounted in the path of the nut holding devices, and means comprising a cam and follower mechanism for rotating the holders to place each face of the nuts held thereby in a position to be slotted.

PETER F. ROSSMANN.